March 2, 1948. P. G. COX ET AL 2,437,221
SEDIMENT TRAP FOR FILTER PROVIDED WITH MAGNETIC MEANS
Filed Nov. 18, 1943 2 Sheets-Sheet 1
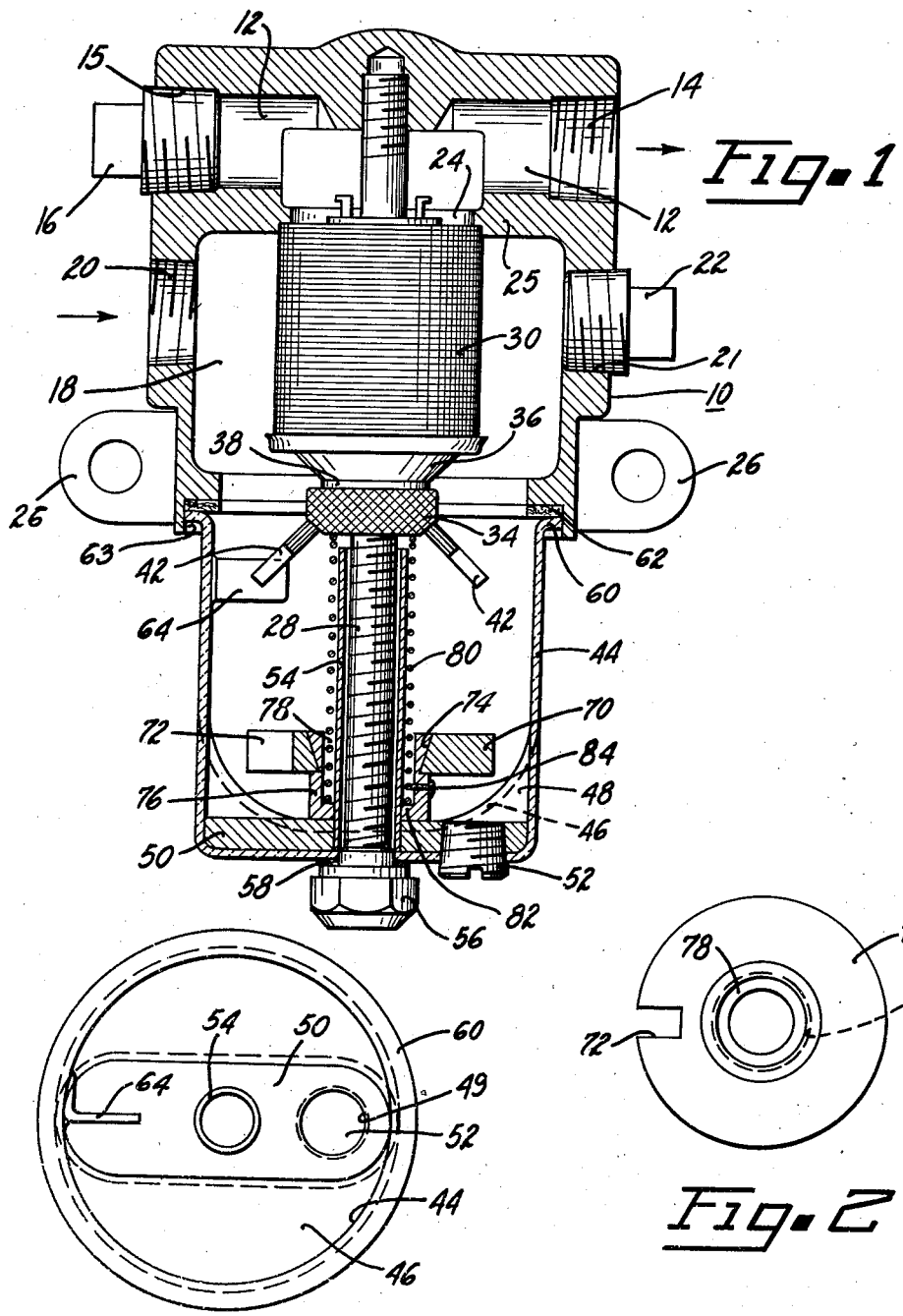
INVENTORS
PARKER G. COX
HANS R. HANSEN
BY March 2, 1948.  P. G. COX ET AL  2,437,221
SEDIMENT TRAP FOR FILTER PROVIDED WITH MAGNETIC MEANS
Filed Nov. 18, 1943  2 Sheets-Sheet 2

INVENTORS
PARKER G. COX
HANS A. HANSEN
BY

Patented Mar. 2, 1948

2,437,221

UNITED STATES PATENT OFFICE 2,437,221

SEDIMENT TRAP FOR FILTERS PROVIDED WITH MAGNETIC MEANS

Parker G. Cox and Hans Albert Hansen, Detroit, Mich., assignors to Bendix Aviation Corporation, South Bend, Ind., a corporation of Delaware Application November 18, 1943, Serial No. 510,736

7 Claims. (Cl. 210—165)

This invention relates generally to apparatus for filtering fluids and has particular reference to magnetic filtering devices.

It is an important object of this invention to provide a filter for filtering various types of fluid such as fuel, oil and the like wherein there is means for removing particles of steel, iron and rust, which may be entrained in the fluid. This feature is particularly important in cases where a magnetic control valve is used to control the fluid flow, the magnetic filter being, of course, on the upstream side of said valve.

Another object of the invention is to provide a device of this character that may be easily assembled and readily disassembled for cleaning or other purposes.

Still another object of the invention is to provide a device of this character having a simple, novel and effective means for securing an element retainer nut so as to prevent accidental loosening thereof.

A further object of the invention is to provide a device of this character having an effective and compact magnet; novel and reliable means for mounting said magnet; and effecting means for retaining same in place so as to prevent vibration and rattling thereof.

A still further object of the invention is to provide a device of this character having means for minimizing the loss of fluid when the bowl is removed for cleaning or other purposes.

Another object of the invention is to provide a device of this character wherein the improvements consist of certain novel details of construction and combinations and arrangements of parts.

Still another object of this invention is to provide a device of this character that is effective, reliable and efficient in operation and that is simple and durable in construction.

The characteristics and advantages of the invention are further sufficiently referred to in connection with the following detailed description of the accompanying drawings, which represent a preferred embodiment. After considering this example, skilled persons will understand that many variations may be made without departing from the principles disclosed; and we contemplate the employment of any structures, arrangements, or modes of operation that are properly within the scope of the appended claims.

In the drawings:

Figure 1 is a vertical section of a filter device embodying the invention;

Figure 2 is a plan view of the magnet assembly per se;

Figure 3 is a plan view of the filter bowl;

Figure 4:
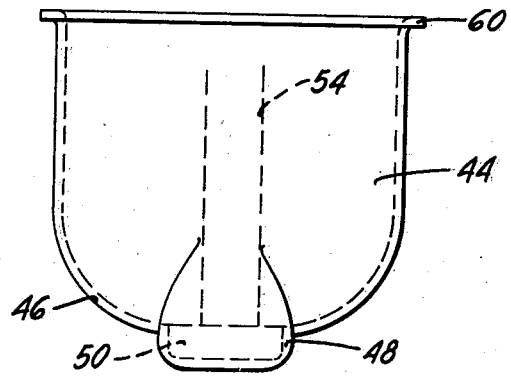
Figure 4 is a side view of the bowl.
Figure 5:
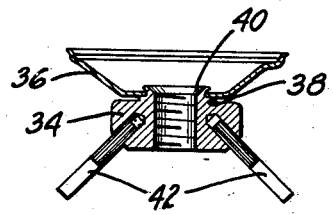
Figure 5 is a vertical section of the element nut and retainer cup assembly.

Referring more particularly to the drawings the device comprises a filter head 10 having an outlet passage 12 extending horizontally therethrough adjacent the top thereof, as shown in the drawings, and having threaded outlet openings 14 and 15 the latter being closed by a threaded plug 16. Beneath the passage 12 is a chamber 18 having a threaded inlet 20 adapted to be connected with a source of fluid. Opposite the inlet 20 is a second threaded passage 21 into the chamber 18 which is normally closed by plug 22 screwed therein. The chamber 18 and passage 12 are connected by a passage 24 in a partition 25 separating said chamber and passage. If desired the head may be provided with laterally extending ears 26 for attachment of the device to some convenient support. A stud bolt 28 is threaded into a hole in the top of the filter head and a filter element 30, preferably of the edge type, is received on the stud 28 and covers the passage 24, said element 30 having internal, longitudinally extending passageways (not shown) which communicate with passage 24. An element retainer nut 34 is adapted to retain the element 30 in its operative position against the underside of the partition 25, there being an element retainer cup 36 interposed between said nut and filter element for closing the lower end of said filter element. Details of the element nut and retainer cup are more particularly shown in Figure 5 and it will be noted that the nut 34 has a shoulder 38 on which the cup 36 rests. A flange 40 extends through the bottom of the cup and the free end of said flange is peened or overturned slightly to prevent separation of the cup and nut, the cup being adapted to turn freely on the nut. The nut also includes downwardly inclined and outwardly extending knurled pins 42 which are pressed into openings in the nut provided therefor, the purposes of said pins being hereinafter described. The stud 28 extends downwardly beneath the nut 34 and is adapted to receive a bowl 44 thereon which may be of any suitable material such as brass or the like, or if desired may be of some suitable transparent material. The bowl which may be of any suitable type, is shown as having a rounded bottom portion 46 with a depending sump 48, best shown in Figure 4, and within the sump a reinforcing member 50 is secured by brazing or the like. A drain hole 49 is provided in the sump extending through the reinforcing member 50 and said drain hole is normally closed by a plug 52. A tube 54 extends upwardly from the bottom of the bowl, being brazed or otherwise secured thereto, and is disposed about the stud 28, the purpose of said tube being hereinafter described. The bowl is retained in position relative to the head 10 by a bowl nut 56, there being a gasket 58 between the nut 56 and the bottom of the bowl to prevent leakage thereabout. The upper end of the bowl is flanged outwardly at 60 to form a surface of substantial area adapted to abut against a gasket 62 in an annular recess 63 in the lower end of the head 10 to provide a seal between said bowl and head. With the bowl thus secured in position the element retainer nut 34 is prevented from rotating on the stud (except to a limited and unimportant extent) by a lug 64 brazed or otherwise secured to the inside of the bowl and extending inwardly thereof into the path of said pins 42 so as to engage one or the other of the pins 42 thus preventing accidental loosening of the nut and the filtering element 30 due to vibration and the like. A magnet is disposed in the bowl adjacent the bottom thereof and generally comprises a disk-like body 70 having a notch 72 therein to permit lug 64 to pass therethrough in assembling or disassembling the device. The magnet 70 is provided with an axial hole 74 which is tapered, as best shown in Figure 1, and a cup-like base or support 76 is provided for the magnet, the base being of a non-magnetic material, preferably die cast metal, which is cast into the hole 74 of the magnet. The large diameter portion of the hole 74 is disposed upwardly so that when the die cast metal is cast therein a wedge arrangement is provided which prevents separation of the magnet from the support, the lower body portion of which is below the magnet and has a shoulder abutting a portion of the under side of said magnet adjacent the small end of hole 74. The magnet and support are slidably disposed on the tube 54 and said support is provided with an enlarged axial opening 78 extending from the upper end, the sides of said opening being spaced from the tube 54 to accommodate the lower end of a spring 80 which is disposed about the tube 54 and reacts between the element nut 34 and an annular shoulder 82 adjacent the bottom of said support which slidably engages said tube 54. The spring 80 is secured in the support 76 by a screw 84 and is adapted to retain the magnet in position adjacent the bottom of the bowl and prevents rattling or vibration thereof.

*Operation*

In operation, fluid, which may be gasoline, oil or the like, enters the inlet 20 and passes into the chamber 18, through the filtering passages of the filter element 30, longitudinal fluid passages (not shown) in the interior of said element, through the passage 24, into the passage 12 and thence is discharged through the outlet 14. Some of the fuel from the chamber 18 fills the bowl and particles of metal such as steel, iron and/or rust which are entrained in the fluid entering the device are drawn to the magnet 70 and retained thereby to prevent their returning to the fluid stream. It is to be noted that the magnet creates a magnetic field in the bowl so that the particles of magnetic material entrained in the fuel are accelerated toward the magnet.

Should it be desired to remove the sediment, metal particles attached to the magnet and the like, the fluid supply is cut off and the bowl nut 56 removed from the stud 28. The bowl may then be removed from the stud, together with the magnet, its support and the spring 80. There will be some loss of fluid when the bowl is removed but the quantity is reduced to a minimum due to the tube 54 which prevents escape of fluid below the level of the upper end thereof. Should it be desired to also clean the element 30 said element may be removed by unscrewing the element retainer nut 34. After removal of the filter it can then be cleaned in the usual manner.

It is to be noted that the filter head is so arranged as to be connected in a fluid conduit for filtering fluid flowing from left to right through the device as shown in the drawings. However, if it is desired to connect the device to filter fluid flowing in the opposite direction, the plug 22 is removed and screwed into the opening 20 and plug 16 is removed and screwed into the outlet opening 14. The appropriate connections with the fluid conduit are then made and the device is operable in substantially the same manner as hereinbefore described. Also, if desired, a plurality of such devices may be supplied with filtered fluid by connecting each of said devices to the respective outlets 14 and 15. Thus a variety of connection combinations are possible with the present device.

It is thought that the invention and many of its attendant advantages will be understood from the foregoing description and though said invention has been illustrated and described in connection with a single embodiment thereof it will be apparent that various changes may be made in the form, construction and arrangement of the parts without departing from the spirit and scope of the invention or sacrificing all of its material advantages, the form hereinbefore described being merely a preferred embodiment.

We claim:

1. In a magnetic filter for fluids: a head having an inlet and an outlet; an edge type filter element interposed between the inlet and outlet; a bolt received through the filter element and having one end secured to the head; means for retaining the filter element in position comprising a nut and retaining cup rotatably secured thereto and interposed between said nut and the filter element; a plurality of pins fixed to the nut and extending outwardly thereof; a bowl received on the bolt and secured to the head beneath the filter element, there being a fluid passage connecting the inlet and the interior of the bowl; a stop member fixed to the interior of the bowl and positioned in the path of the pins when the nut is in its element retaining position; an imperforated tube extending upwardly from the bottom of the bowl and disposed about the bolt, said tube having its upper end disposed adjacent the plane of the top of the bowl; a magnet; a support for the magnet, received on the tube and positioned adjacent the bottom of the bowl, said support being of non-magnetic material and supporting the magnet in spaced relationship relative to the bottom of said bowl; an opening in the support extending from the upper end thereof, the interior walls of said opening being in spaced relation to the tube; a spring about the tube, extending into the opening in the support and reacting between said support and the nut to retain the support and magnet in position adjacent the bottom of the bowl.

2. In a filter for fluids: a head having an enlarged chamber with an inlet and an outlet therefor; a filter element interposed between said inlet and outlet; a bolt secured to the head; a bowl received on the bolt and having an open end in sealed relationship with the head; a fluid passage between the enlarged chamber and the bowl; a magnet disposed within the bowl adjacent the bottom thereof and spaced from the sides of said bowl; resilient means adapted to retain the magnet in its position adjacent the bottom of the bowl; and means of non-magnetic material for insulating the magnet from the resilient means, bolt and bowl.

3. In a filter for fluids: a head having an inlet and an outlet; a filtering element interposed between said inlet and outlet; a bowl having a hole in the bottom thereof depending from the head; a passage connecting the inlet and the interior of the bowl; a tube secured to the bottom of the bowl over said hole and extending upwardly therefrom, the upper end of said tube being adjacent the plane of the upper end of the bowl; a bolt received in the tube and secured to the head; and a nut on the outer end of the bolt for securing the bowl to the head; said tube being adapted to prevent any substantial loss of fuel when said bowl is removed from the filter.

4. In a filter for fluids: a head having an inlet and an outlet; an edge type filtering element interposed between said inlet and outlet; a bowl of non-magnetic material depending from the head; a passage connecting the inlet and the interior of the bowl; a tube secured to the bottom of the bowl and extending upwardly therefrom, the upper end of said tube being adjacent the plane of the upper end of the bowl; a bolt extending through the tube and secured to the head; a nut on the outer end of the bolt for securing the bowl to the head; a magnet adjacent the bottom of the bowl and disposed about the tube; means supporting said magnet on the bottom of said bowl; and a spring about the tube engaging said support to retain the magnet in position.

5. The invention defined by claim 3 including a magnet disposed about the tube spaced from the walls of the bowl; a magnet support of non-magnetic material disposed about the tube and positioned on the bottom of the bowl for insulating the magnet from said tube, said support having an opening receiving said tube and a shoulder adjacent said opening; and a spring encircling said tube and engaging said shoulder to retain the support in position on the bottom of the bowl.

6. In a filter for fluids: a head having an inlet and outlet; a filter element interposed between the inlet and outlet; a bolt received through said filter element and having one end secured to the head; a nut received on the bolt and adapted to secure the filter element; outwardly extending members on the nut; a bowl on the bolt; means for retaining the bowl in position; and a fixed stop member within the bowl disposed in the path of the nut members.

7. In a filter for fluids: a head having an inlet and an outlet; an edge type filter element interposed between the inlet and outlet; a bolt received through said filter element and having one end secured to the head; a nut received on the bolt and adapted to secure the filter element in position; an outwardly extending member on the nut; a bowl on the bolt; means for retaining the bowl in position; a fixed stop member on the bowl disposed in the path of the nut member; and a magnet disposed on the bolt and positioned adjacent the bottom of the bowl, said magnet being provided with a peripheral notch adapted to permit the stop member to pass therethrough in assembling the filter.

PARKER G. COX.
HANS ALBERT HANSEN.

REFERENCES CITED

The following references are of record in the file of this patent:

UNITED STATES PATENTS

| Number | Name | Date |
|---|---|---|
| 1,745,248 | De Guenther | Jan. 28, 1930 |
| 1,768,367 | McKinley et al. | June 24, 1930 |
| 1,744,837 | Pelletier | Jan. 28, 1930 |
| 1,797,399 | Boulade | Mar. 24, 1931 |
| 2,014,800 | De Guenther | Sept. 17, 1935 |
| 2,032,828 | Attwood | Mar. 3, 1936 |
| 2,141,436 | Harris | Dec. 27, 1938 |
| 2,322,131 | Heftler | June 15, 1943 |
| 1,602,935 | Rasey | Oct. 12, 1926 |
| 1,263,406 | Hadley | Apr. 23, 1918 |
| 2,117,361 | Rohrbach | May 17, 1938 |
| 1,606,356 | Risher | Nov. 9, 1926 |
| 2,031,936 | Cuno | Feb. 25, 1936 |
| 2,320,725 | Hautzenroeder | June 1, 1943 |
| 2,068,394 | Burckhalter et al. | Jan. 19, 1937 |
| 2,188,643 | Laderer | Jan. 30, 1940 |

FOREIGN PATENTS

| Number | Country | Date |
|---|---|---|
| 272,784 | Great Britain | June 23, 1927 |